(12) United States Patent
Uhlenbruck et al.

(10) Patent No.: US 10,827,720 B2
(45) Date of Patent: Nov. 10, 2020

(54) METHOD FOR OPERATING A MILKING PLANT

(71) Applicant: GEA Farm Technologies GmbH, Bönen (DE)

(72) Inventors: Franz Uhlenbruck, Sinsheim (DE); Martin Spohr, Oppenweiler (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

(21) Appl. No.: 16/359,607

(22) Filed: Mar. 20, 2019

(65) Prior Publication Data

US 2020/0022329 A1 Jan. 23, 2020

Related U.S. Application Data

(63) Continuation of application No. 14/385,988, filed as application No. PCT/EP2013/056029 on Mar. 22, 2013, now Pat. No. 10,251,366.

(30) Foreign Application Priority Data

Mar. 22, 2012 (DE) .................... 10 2012 005 649

(51) Int. Cl.
*A01J 5/04* (2006.01)
*A01J 5/007* (2006.01)
(Continued)

(52) U.S. Cl.
CPC .............. *A01J 5/048* (2013.01); *A01J 5/007* (2013.01); *A01J 5/16* (2013.01); *A01J 7/00* (2013.01)

(58) Field of Classification Search
CPC .... A01J 5/01; A01J 5/048; A01J 5/007; A01J 5/16; A01J 5/0075
See application file for complete search history.

(56) References Cited

U.S. PATENT DOCUMENTS

| 5,090,359 A | * | 2/1992 | Pettersson | ............... | A01J 5/007 119/14.08 |
| 5,116,119 A | * | 5/1992 | Brayer | .................... | G01F 1/002 119/14.15 |

(Continued)

FOREIGN PATENT DOCUMENTS

| DE | 3609275 A1 | 9/1987 |
| DE | 19614377 | 10/1997 |

(Continued)

OTHER PUBLICATIONS

Letter Regarding Opposition Procedure filed by GEA Farm Technologies Gmbh in the Opposition of EP Patent 2827704 on Sep. 26, 2019, 10 pages.

(Continued)

*Primary Examiner* — Monica L Barlow
*Assistant Examiner* — Aaron M Rodziwicz
(74) *Attorney, Agent, or Firm* — Smith Law Office; Jeffry W. Smith

(57) ABSTRACT

In order to avoid negative changes in the teat ends of a cow, in particular to avoid hyperkeratoses, the invention proposes a method for operating a milking system in which at least one of the parameters from total pressure per cycle, minimum total pressure per cycle or the ratio of total suction to total pressure is determined for at least one animal of a herd during at least one part of a milking process, and is compared with at least one reference value.

13 Claims, 3 Drawing Sheets

(51) Int. Cl.
*A01J 5/16* (2006.01)
*A01J 7/00* (2006.01)

(56) References Cited

U.S. PATENT DOCUMENTS

| | | | | |
|---|---|---|---|---|
| 5,178,095 | A * | 1/1993 | Mein | A01J 5/007 119/14.02 |
| 5,970,910 | A * | 10/1999 | Grimm | A01J 5/007 119/14.02 |
| 5,992,347 | A * | 11/1999 | Innings | A01J 5/007 119/14.07 |
| 6,957,625 | B2 | 10/2005 | Hennig | |
| 7,117,815 | B2 * | 10/2006 | van den Berg | A01J 5/007 119/14.08 |
| 7,752,680 | B2 | 7/2010 | Bushman | |
| 8,683,945 | B2 | 4/2014 | Wartenhorst | |
| 10,251,366 | B2 | 4/2019 | Uhlenbruck et al. | |
| 2004/0168647 | A1 * | 9/2004 | Brown | A01J 5/007 119/14.41 |
| 2006/0243210 | A1 | 11/2006 | Kaever et al. | |
| 2007/0137580 | A1 * | 6/2007 | Brown | A01J 5/14 119/14.14 |
| 2011/0004154 | A1 * | 1/2011 | Van Schijndel | A61M 1/06 604/74 |
| 2011/0041770 | A1 * | 2/2011 | Westman | A01J 7/022 119/14.15 |
| 2015/0068458 | A1 * | 3/2015 | Uhlenbruck | A01J 5/007 119/14.02 |

FOREIGN PATENT DOCUMENTS

| | | |
|---|---|---|
| DE | 69615361 | 5/2002 |
| DE | 102004059572 | 6/2006 |
| DE | 19983196 | 4/2010 |
| EP | 1000535 | 5/2000 |
| EP | 1287737 | 3/2003 |
| EP | 1621073 A2 | 2/2006 |
| EP | 2036470 | 6/2010 |
| EP | 2827704 B1 | 5/2016 |
| GB | 2352033 | 1/2001 |
| WO | 9636211 | 11/1996 |
| WO | 9959399 | 11/1999 |
| WO | 0045630 | 8/2000 |
| WO | 0067560 | 11/2000 |
| WO | 2001019170 | 3/2001 |
| WO | 2001056369 | 8/2001 |
| WO | 2002052927 | 7/2002 |
| WO | 2002084260 | 10/2002 |
| WO | 2005093387 | 10/2005 |

OTHER PUBLICATIONS

English Translation of International Search Report and Written Opinion dated Sep. 17, 2014, PCT/EP2013/056029.
German Office Action in corresponding application No. 10 2012 005 205, dated Mar. 1, 2013.
G. Mein and D.J. Reinemann, "Biomechanics of Milking: Teat-Liner Interactions"; ASABE Meeting Presentation, Paper No. 09743; Grand Sierra Resort and Casino, Reno, Nevada/ Jun. 21-Jun. 24, 2009.
Dr. L. Daßler "Besser und schneller melken"; Landwirtschaftliches Wochenblatt; LW 45/2008.
"Technik für die Überprüfung von Melkvorgängen"; E. Schütte; Vortrag am Jun. 12, 2009 im Rahmen eines Seminars des Instituts für landwirtschaftliche Verfahrenstechnik der Christian-Albrechts-Universität zu Kiel.
"Messungen unter Melkbedingungen"; E. Schutte; Ausdruck Skript; 25., May 26, 2010; WGM-Workshop „Dynamische Messung"; Westerstede und 15., Jun. 16, 2010 WGM-Workshop,, Dynamische Messung"; Böbingen an der Rems.
"Melkprobleme"; E. Schütte; Ausdruck Skript; 25., May 26, 2010; WGM-Workshop,,Dynamische Messung"; Westerstede und 15., Jun. 16, 2010 WGM-Workshop „Dynamische Messung"; Böbingen an der Rems.
"Ausdruck der Ergebnisse einer beispielhaften Berechnung von Drucksummen mittels der Excel Datei,, duin-65"; E. Schütte; 25., May 26, 2010; WGM-Workshop,, Dynamische Messung"; Westerstede und 15., Jun. 16, 2010 WGM-Workshop,, Dynamische Messung"; Bobingen an der Rems.
K. Muthukumarappan, D.J. Reinemann and G.A. Mein; "Compressive Load Applied by the Teatcup Liner to the Bovine Teat"; ASAE Meeting Presentation; Paper No. 933538, Chicago, Illinois; Dec. 14-17, 1993.
D.J. Reinemann and G.A. Mein; "Unraveling the mysteries of liner compression"; Paper Presented at Countdown Meeting; Melbourne, Australia, Jun. 2011.
G.A. Mein, D.M. William, C.C. Thiel "Compressive load applied by the teatcup liner to the bovine teat"; J Dair Res. Aug. 1987; 54(3);327-37.
Eidesstattliche Versicherung von Herm Eckard Schütte als präsentes Beweismittel in Bezug auf die Entgegenhaltung E24.
Eidesstattliche Versicherung von Frau Dr.sc.agr. Angelika Häußermann als präsentes Beweismittel in Bezug auf die Entgegenhaltung E24.
Eidesstattliche Versicherung von Herm Eckard Schütte als präsentes Beweismittel in Bezug auf die Entgegenhaltungen E25, E26 and E27.
Affidavit by Mister Eckard Scuuttee as present evidence relative to the references E24, E26 and E27.
Teilnehmerliste des WGM-Workshops,, "Dynamische Messung" vom 25., May 26, 2010 in Westerstede.
Teilnehmerliste des WGM-Workshops "Dynamische Messung" vom 15., Jun. 16, 2010 in Böbingen an der Rems.
Notice of Opposition against EP Patent 2827704, filed by DeLaval International AB on Feb. 10, 2017, 16 pages.
Notice of Opposition against EP Patent 2827704, filed by Eckard Schütte on Feb. 10, 2017, 54 pages.
Mein et al., "Effects of Milking on Teat-End Hyperkeratosis: 1. Mechanical Forces Applied by the Teatcup Liner and Responses of the Teat." 42nd annual meeting of the National Mastitis Council, Fort Worth Texas, USA, Jan. 26-29, 2003.
Reinemann, "The smart position on teat condition." Proceedings of the New Zealand Milk Quality Conference, Jan. 2012.
Neijenhuis, "Relationship Between Teat-End Callosity or Hyperkeratosis and Mastitis" AABP-NMC International Symposium on Mastitis and Milk Quality, Vancouver, BC, Canada. Sep. 2001.
Mein et a., "Evaluation of Bovine Teat Condition in Commercial Dairy Herds: 1. Non-Infectious Factors." AABP-NMC International Symposium on Mastitis and Milk Quality in Vancouver, BC, Canada. Sep. 13-15, 2001.
Reinenmann, "Latest Thoughts on Methods for Assessing Teat Condition." 46th Annual Meeting of the NMC Jan. 21-24, 2007, San Antonio, TX, USA.
Ohnstad, "Addressing Teat Condition Problems." Teat Club International, 7 pages.
Milking Machine Installations—Mechanical Tests, ISO 6690, 3rd Edition, Feb. 15, 2007.
Response filed in the Opposition of EP Patent 2827704 by GEA Farm Technologies GmbH, Sep. 15, 2017.
Preliminary Opinion of the EPO Opposition Division in the Opposition of EP Patent 2827704, Jan. 24, 2019, 12 pages.
Letter Regarding Opposition Procedure filed by DeLaval International AB Sep. 27, 2019, 8 pages.
Written Submission in Preparation of Oral Hearings filed by GEA Farm Technologies GmbH in the Opposition of EP Patent 2827704 on Oct. 28, 2019, 14 pages.
Decision of the Opposition Division and Grounds for the Decision to Revoke European Patent in the Opposition of EP Patent 2827704, issued Jan. 24, 2020, 25 pages.
Means of Redress in the Opposition of EP Patent 2827704, issued Jan. 24, 2020, 2 pages.
Minutes of Oral Proceedings in the Opposition of EP Patent 2827704, issued Jan. 24, 2020, 2 pages.
Minutes of the Taking of Evidence in the Opposition of EP Patent 2827704, issued Feb. 7, 2020, 10 pages.

(56) References Cited

OTHER PUBLICATIONS

Statement of Grounds of Appeal filed by Keenway Patentanwälte on May 20, 2020 in the Opposition of EP Patent 2827704, 38 pages.

* cited by examiner

METHOD FOR OPERATING A MILKING PLANT

CROSS REFERENCE TO RELATED APPLICATION

This application is continuation of U.S. application Ser. No. 14/385,988, filed on Sep. 17, 2014, which is a National Stage Entry of PCT/EP2013/056029, filed Mar. 22, 2013.

FIELD AND BACKGROUND OF THE INVENTION

The subject matter of the invention relates to a method for operating a milking system.

Although, in the following text, the invention will be described in conjunction with a milking system for milking cows, it is pointed out that the subject matter of the invention is in particular also suitable for milking systems for milking sheep, goats, llamas, camels, dromedaries, buffaloes, mares, donkeys, yaks and other milk-yielding animals. The invention can be used both in robot-assisted milking systems and in fully automatic, semi-automatic or conventional milking systems.

A milking farm has numerous systems which are important for dairy farming. The milking system can have a plurality of milking stands, which are each equipped with a milking device. The milking device has at least one milking cup, which is connected via a long milk hose to a milk transport line. Also known are devices in which the milking cups are each connected via a short milk hose to a milk collecting container, the milk collecting container being connected to the milk transport line via a long milk hose, possibly with the interposition of a measuring cup or measuring container.

Milking systems are operated under predefined operating conditions, which, for example, concern the milking vacuum, cycle frequency of a pulsator. It is known that a milking system is operated with specific operating parameters. Testing of the milking system and the components thereof can be carried out by means of measurements according to DIN/ISO 6690. Although the milking system operates within predefined operating parameters, it is possible for impairment to occur to the udder health, in particular the teat condition.

It is known that negative changes to the teat ends, in particular the production of hyperkeratoses, can also be attributed to milking parameters. Depending on the set milking parameters, it is possible for doughy, blue-colored teats to occur.

SUMMARY OF THE INVENTION

Starting from this point, the present invention is based on the object of specifying a method for operating a milking system in order to achieve an improved teat condition.

This object is achieved by a method for operating a milking system having the features as generally described herein. Further advantageous refinements of the invention are specified in details and alternatives described below. The features listed individually can be combined with one another in any desired technologically expedient way and can be extended by explanatory facts from the description, further embodiments of the invention being indicated.

According to the inventive method for operating a milking system, it is proposed that at least one of the parameters from total pressure per cycle, minimum total pressure per cycle or the ratio of total suction to total pressure be determined for at least one animal of a herd during at least one part of a milking process, and be compared with at least one reference value.

If the system is operated in accordance with the method, an improved teat condition of the animal can be achieved.

In particular, it has been established that, in such an operating system, a reduction in the occurrence of hyperkeratoses can be achieved.

The term cycle is understood to mean at least one pulsator cycle, preferably a plurality of pulsator cycles during a milking process. The term cycle can also comprise the duration of individual milking processes or else all the milking processes during a lactation period.

In the following text, the term cycle will be used in connection with a milking process, without the subject matter of the invention being limited thereby.

During the milking process, the variations in vacuum in the pulsation chamber of at least one milking cup and in the interior of the milking cup are measured. The measurement can be carried out indirectly or directly. For instance, the variation in vacuum can be measured in the pulsation hose instead of in the pulsation chamber of the milking cup. The measurement of the vacuum in the interior of the milking cup can be carried out directly or indirectly. An indirect measurement of the variation in vacuum in the milking cup interior can be carried out by the variation in vacuum being measured in the short milk hose, in particular adjacent to the teat liner. By using the variations in vacuum that are determined in the pulsation and milking cup interior, a differential pressure curve is formed. In order to form the differential pressure curve per cycle, in particular per pulsation cycle, for the time-discrete measuring points, the associated values are considered, specifically in such a way that the pulsation chamber vacuum is subtracted from the vacuum in the teat liner interior. From this there follows a differential pressure curve, which changes over the duration of the milking process, which means one cycle.

In order to determine the actual pressure loading of a teat, a fold-in pressure of the teat liner is determined. Preferably, the current fold-in pressure of the teat liner is determined. The fold-in pressure of the teat liner is the pressure difference which is required to deform the teat liner to such an extent that the opposite sides of the teat liner shaft just touch. The teat liner is open when the differential pressure is lower than the fold-in pressure of the teat liner. It is then possible to speak of a teat-liner open phase. In the massage phase, the differential pressure is higher than the fold-in pressure of the teat liner.

If the variation in the pressure difference during a cycle and the constant fold-in pressure are illustrated in a graph, then the differential pressure curve and the fold-in pressure straight line bound an area. Depending on the milking duration and the number of pulsator cycles generated by a pulsator during the milking period, a plurality of the areas enclosed by the differential pressure curve and the fold-in pressure straight line is determined. From this, the total pressure per cycle is calculated as an average of a milking process (cycle). From the known individual total pressures per cycle, the lowest value of the total pressure per cycle during the entire milking is determined. The minimum total pressure per cycle represents one parameter.

The total suction parameter takes into account the action of the teat-end vacuum during the teat liner open phase.

The teat liner open phase is present when the differential pressure is lower than the fold-in pressure of the teat liner. The parameter total sum per cycle can be calculated as the product of the average teat-end vacuum during the teat liner open phase and the length of said phase.

The measurement of the vacuum in the pulsation chamber and in the milking cup interior can be carried out during an entire milking process or within predefined sections of the milking process. The measurement is preferably carried out in an initial and a final phase of the milking process. The parameters derived from the measurements already supply meaningful results relating to the assessment of the milking system.

At least one of the parameters is compared with a predefined reference value.

The total pressure per cycle can be calculated as an arithmetic, geometric or harmonic mean value. This can also be done for the total suction.

In order to improve the method further, it is proposed that the cycle comprise at least one milking process. The method for operating a milking system can also take into account a multiplicity of animals and milking processes.

By means of appropriate adaptation of the milking parameters, an improved teat condition and udder health can be achieved.

An improvement in the teat condition, in particular in the presence of hyperkeratoses, is achieved in particular when the milking system, in particular a milking system for milking cows, is operated in such a way that the reference value for the parameter total pressure per cycle lies between 5 and 11 kPa*s, in particular 6.75 and 9 kPa*s.

According to a still further advantageous refinement method, it is proposed that reference value for the parameter minimum total pressure per cycle lie between 5 and 9 kPa*s, in particular between 5.30 and 8.10 kPa*s.

This value range is suitable in particular for milking systems for milking cows.

The milking system, in particular for milking cows, should in particular be operated such that the reference value for the ratio of total suction to total pressure lies between 2 and 5, in particular between 2.75 and 3.75. If the system is possibly operated within a tolerance band around the reference values previously indicated, the occurrence of hyperkeratoses is reduced.

It has been established that the parameters describe an influence on the teat condition. Excessively low values for the total pressure per cycle often lead to blue-colored teats. Excessively high values are associated with increased hyperkeratoses.

The ratio of total suction to total pressure is correlated with edema formation. The extent of the teat cup edema caused by the negative pressure requires appropriate re-massage of the edema liquid. Displacement of the ratio from the beneficial range towards increased application of vacuum or increased teat compression impairs the teat cup integrity and promotes the expression of hyperkeratoses. The comparatively close correlation of these parameters with the expression of hyperkeratoses makes it clear that the actual conditions at the teat cup cannot be reproduced by the parameters measured in accordance with DIN/ISO. An important aspect is formed by the fold-in pressure of the teat liner, which is relevant to the action of pressure on the teat cup. Depending on the result of the comparison, the fold-in pressure of a teat liner is changed. This can also be done, for example, by at least one teat liner being changed for another teat liner having different material properties or geometries.

Depending on at least one comparison, at least one operating parameter of a pulsator is changed. In particular, the number of cycles and/or the phase ratio, in particular the suction phase ratio of the pulsator, can be changed.

According to a still further advantageous idea, it is proposed that the level of vacuum in the area of the teat ends in the milking cup be changed, indirectly or directly, as a function of at least one comparison.

Additionally or alternatively, the variation in the vacuum in the area of the teat ends in the milking cup can also be varied.

If this is possible, the changes can be carried out, for example, via the number of cycles and the suction phase ratio of the pulsator during the milking process.

Further details and advantages of the invention will be explained by using the figures illustrated in the drawing, in which:

DETAILED DESCRIPTION OF THE DRAWINGS

Figure 1:
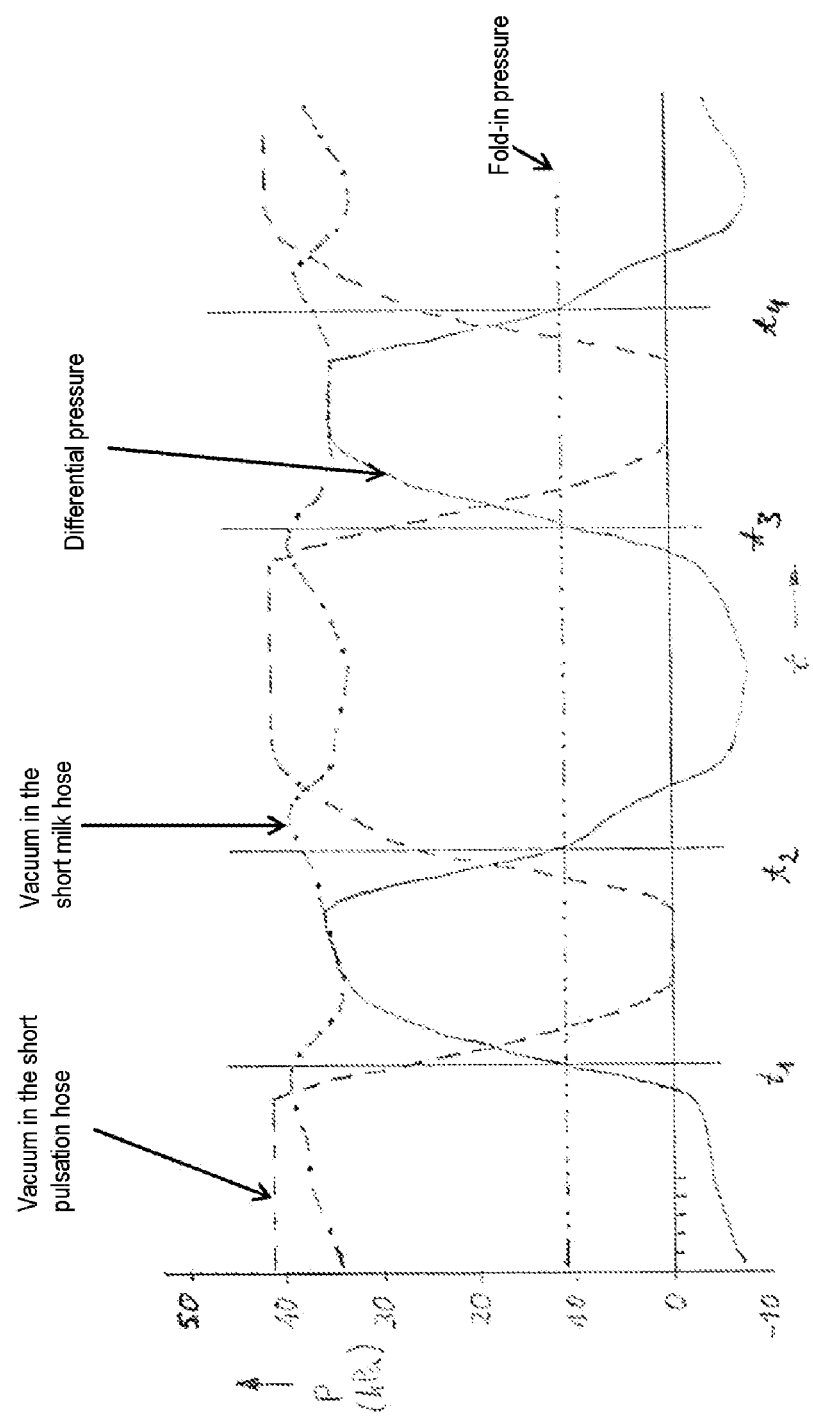
FIG. 1 shows a graph of the pressure variations

FIG. 1 shows a graph of the relevant pressure variations during a cycle which comprises a plurality of pulsation cycles. The variation of the vacuum in the short pulsation hose is shown dashed. The dash-dotted line reproduces the variation of the vacuum in the short milk hose over the time t. It can be seen from the variation of the vacuum in the short milk hose that the vacuum fluctuates between about 35 kPa and 40 kPa. At each point in time, the differential pressure between the vacuum in the short milk hose and the vacuum in the short pulsation hose is determined. This differential pressure is illustrated as a curve in FIG. 1. In the area in which the vacuum in the short pulsation hose is 0, the variation of the differential pressure corresponds to that of the vacuum in the short milk hose. The pressure variation in the short milk hose should be measured adjacent to the teat end. The variation of the differential pressure is illustrated in FIG. 1 as a continuous line.

FIG. 1 also shows the fold-in pressure value of the teat liner, which is around 11 kPa in the example illustrated.

The fold-in pressure is time-independent. It is constant.
In the figure, it is shown as dash-dot-dot.

The illustration according to FIG. 1 reveals that, at the times $t_1$, $t_2$, $t_3$ and $t_4$, the differential pressure curve and the fold-in pressure of the teat liner exhibit intersections.

The fold-in pressure of the teat liner is the pressure difference which is necessary to deform the teat liner to such an extent that the opposite sides of the teat liner shaft just touch. According to this definition, the teat liner is open when the differential pressure is lower than the fold-in pressure of the teat liner. In the time interval between $t_2$ and $t_3$, the teat liner is open.

In the time intervals $t_1$ to $t_2$ and $t_3$ to $t_4$, the teat liner is closed.

Figure 2:
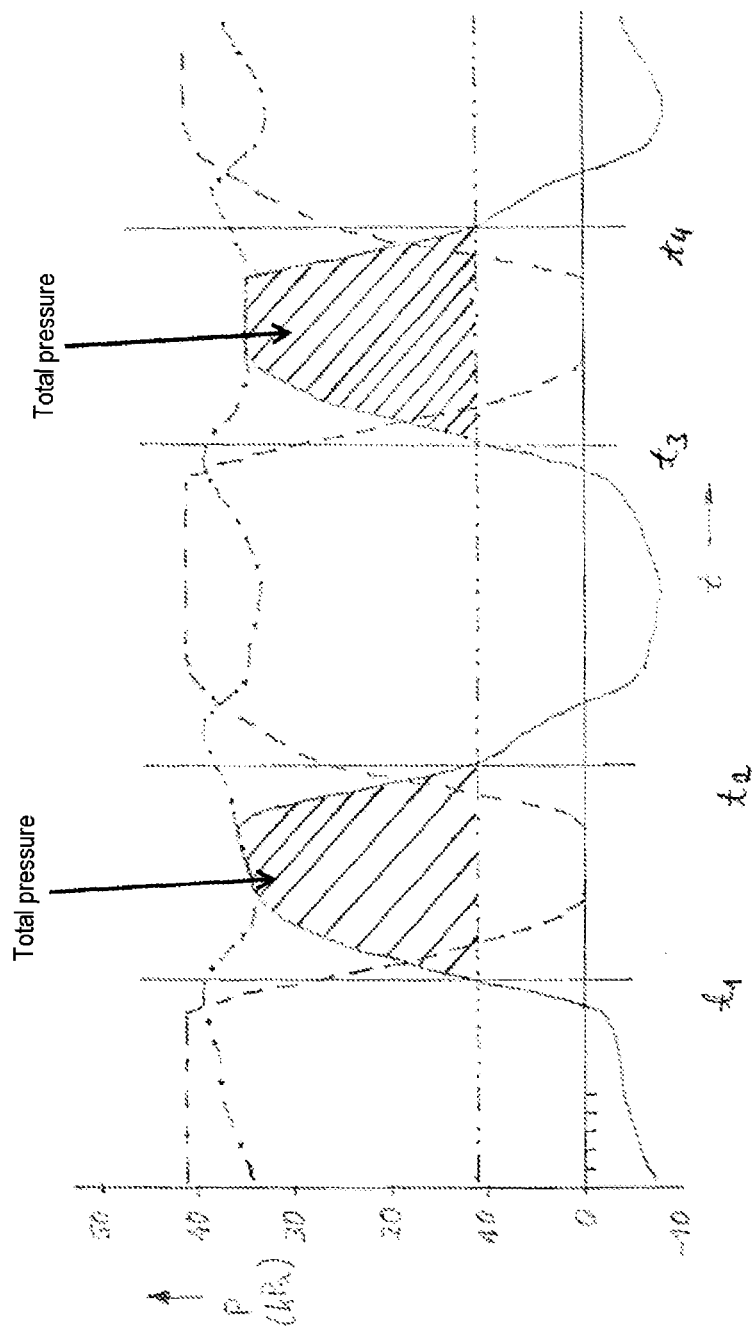
FIG. 2 shows a graph with total pressure per cycle.

FIG. 2 shows the graph according to FIG. 1 supplemented by the parameter total pressure per cycle, which is illustrated as a hatched area. The total pressure per cycle corresponds to the area illustrated hatched according to FIG. 2 and the by the variation of the differential pressure for the duration of the closed teat liner. The total pressure per cycle can be determined as a mean value during a milking process.

From the thus determined total pressures per cycle, the lowest total pressure per cycle can also be derived.

Figure 3:
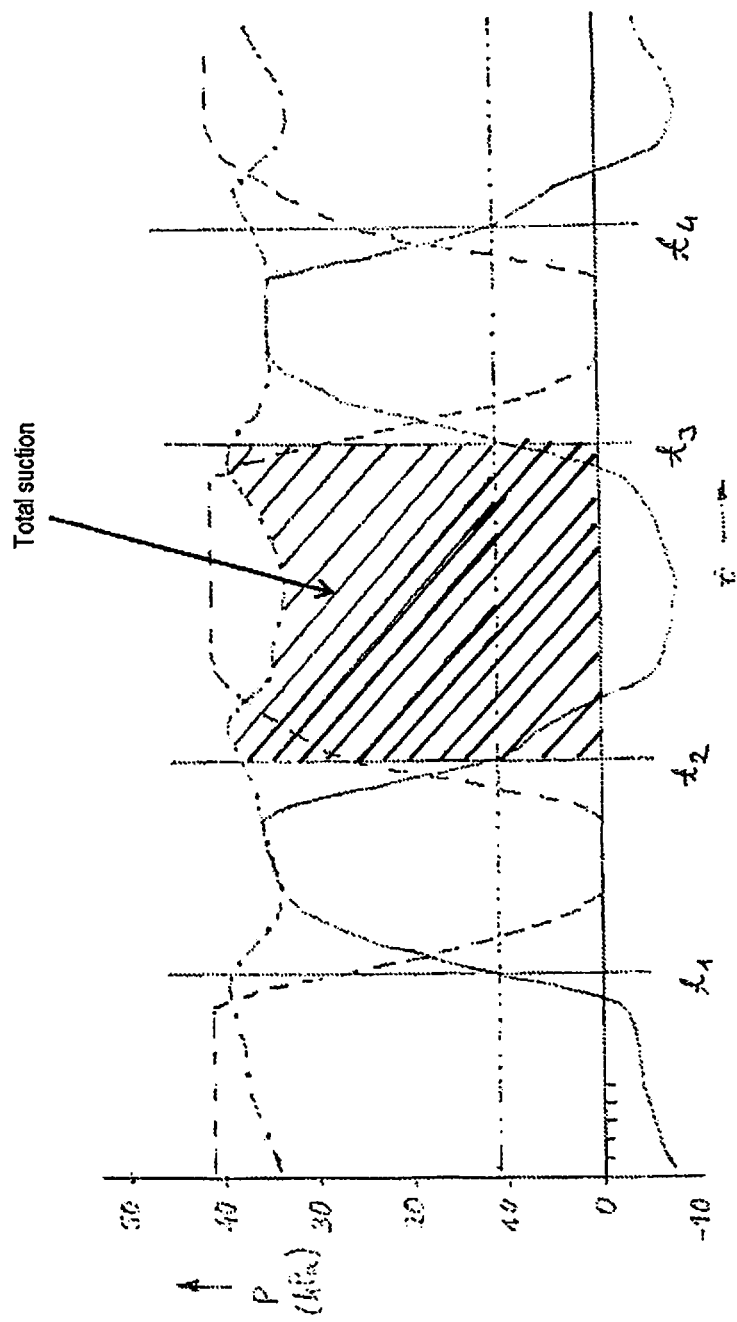
FIG. 3 shows a graph with total suction per cycle.

FIG. 3 shows a graph in which the pressure variations corresponding to the graph according to FIGS. 1 and 2 are illustrated. Hatched in FIG. 3 is an area which lies between the times $t_2$ and $t_3$ and is bounded by the zero value (zero value is the value at which the pressure is zero kPa) and the pressure in the short milk hose. This area forms the total suction per cycle and can be determined, for example, by forming an integral.

From the parameters determined in this way, comprising total pressure per cycle, lowest total pressure per cycle and the ratio of total consumption to total pressure, parameters which can be compared with reference values are provided. If the parameters lie outside a tolerance band, it can be assumed that the milking system is not operating in an optimal state, which can be reflected, for example, in the formation of hyperkeratoses. The individual components or variations of the vacuum can thus be controlled or adjusted such that the milking system preferably operates within a tolerance band around the reference values, which has a positive effect on the teat condition.

The adaptation of the milking system can be carried out during the milking process. In particular, changes of operating vacuum of the milking system and also pulsator settings can be derived automatically and controlled or regulated automatically. However, this is not absolutely necessary. An adaptation of the operating parameters, in particular of the operating vacuum and of the pulsator settings of the milking system, can also be carried out in an animal-individual manner.

Examinations have been carried out in about 30 herds, wherein the herds examined comprised Holstein, Red Holstein and Holstein-Frisian cows. There were weakly significant positive correlations with system vacuum ($r=0.459$) and with the maximum differential pressure in the massage phase ($r=0.366$). The strongest relationship with the frequency of horny hyperkeratoses in the herd was had by the parameters "total pressure per cycle", "lowest total pressure per cycle" and the "ratio of total suction to total pressure". All three parameters exhibited a quadratic relationship.

| | Correlation coefficient r | Preferred range |
|---|---|---|
| Total pressure per cycle | 0.760 | 6.75-9.00 kPa*s |
| Lowest total pressure per cycle | 0.746 | 5.30-8.10 kPa*s |
| Total suction per total pressure | 0.616 | 2.75-3.75 |

For all three parameters, it is possible to detect both preferred ranges and also ranges with an excessively high or excessively low pressure action of the teat liner. In the case of an excessively high pressure action, the teat tissue reacts with intensified horny skin formation ("callusing"). In the case of an excessively low pressure action, the teat swells (edema), and the lasting action of the teat liner on this swollen teat causes numerous lesions, which leads to inflammation and ultimately to scar tissue. Furthermore, an examination of the change in the papillary duct condition in an operation having a herd-wide poor papillary duct condition (28% of the cows had a hyperkeratosis of class III and IV) was carried out. The classification of the hyperkeratosis was carried out in accordance with "Methods for Evaluating Teat Condition Recommended by the Teat Club International".

The herd examined comprised 60 lactating Holstein cows which had been milked in a 2×6 herringbone milking parlor with deep-routed milking line and automatic removal with a system vacuum of 42.7 kPa and a fold-in pressure of the teat lining of 7.7 kPa. The measurements of the pressure variations were carried out as a simultaneous 2-channel measurement with a measuring frequency of 30 Hz.

Measurements were always carried out on a front quarter. The measurement began after the end of automatic stimulation and ended at the instant of automatic removal. The table below reproduces the measurements and the changes in the hyperkeratosis class.

| | $1^{st}$ measurement: Day 0 | $2^{nd}$ measurement: Day 5 | $3^{rd}$ measurement: Day 49 |
|---|---|---|---|
| System vacuum (kPa) | 42.7 | 40.1 | 40.1 |
| Fold-in pressure (kPa) | 7.7 | 13.3 | 13.0 |
| Total pressure per cycle | 10.63 | 7.52 | 6.85 |
| Total suction per cycle | 21.56 | 22.27 | 20.67 |
| Total pressure/Total suction | 1.99 | 2.96 | 3.03 |
| Hyperkeratosis class I | 25% | 27% | 39% |
| Hyperkeratosis class II | 47% | 40% | 47% |
| Hyperkeratosis class III | 20% | 25% | 12% |
| Hyperkeratosis class IV | 8% | 8% | 2% |

In order to improve the milking conditions, a change was made to the teat liner (increase of the fold-in pressure from 7.7 kPa to 13.3 kPa). The increase in the fold-in pressure led to a lowering of the parameter total pressure per cycle. A "harder" teat liner closes later, opens earlier and, in the fully collapsed state, exerts less pressure on the teat.

The system vacuum was lowered from 42.7 to 40.1 kPa in the same time period. This change likewise influenced the value of the total pressure per cycle. According to theoretical calculations, with the same level of vacuum, a total pressure per cycle of 8.36 kPa would have been expected. It is therefore possible to draw the conclusion that the reduction in the vacuum of the system by 2.6 kPa resulted in a reduction in the total pressure per cycle by 1 kPa*s (30% less). A shortening of the time of the relief phase (from 200 ms to 100 ms) increases the value of the total suction per cycle slightly. The results in the table show that the papillary duct condition of the animals in the herd had improved considerably within the trial time period. Only 14% of the animals still had a hyperkeratosis of classes III and IV.

The invention claimed is:

1. A method for operating a milking system, the method comprising the steps of:
   determining a parameter from:
   a total pressure per cycle, wherein the total pressure per cycle is determined from an integral of a differential pressure curve and a fold-in pressure straight line over a predetermined time interval, wherein the differential pressure curve is determined from a vacuum in a short pulsation hose and a vacuum in a short milk hose;
   a minimum total pressure per cycle, wherein the minimum total pressure per cycle is determined by a lowest total pressure per cycle; and a ratio of total suction per cycle to total pressure per cycle for at least one animal of a herd during at least one part of a milking process, wherein the total suction per cycle is defined as the integral of the pressure in the short milk hose in the predetermined time interval during a suction cycle; and comparing the parameter to at least one a reference value.

2. The method of claim 1, in which the total pressure per cycle is determined using a value from the group consisting of: an arithmetic, geometric, and harmonic mean value.

3. The method of claim 1, in which the parameter is determined during an entire milking process.

4. The method of claim 1, in which the reference value for the parameter total pressure per cycle lies between 5 kPa's and 11 kPa's.

5. The method of claim 1, in which the reference value for the parameter minimum total pressure per cycle lies between 5 kPa's and 9 kPa's.

6. The method of claim 1, in which the reference value for the ratio of total suction to total pressure lies between 2 and 5.

7. The method of claim 1, and further comprising the step of:

changing a fold-in pressure of at least one teat liner based on the comparison of the parameter to the reference value.

8. The method of claim 1, and further comprising the step of:

changing at least one operating parameter of a pulsator based on the comparison of the parameter to the reference value.

9. The method of claim 1, and further comprising the step of:

changing a level of vacuum in an area of a teat end in a milking cup based on the comparison of the parameter to the reference value.

10. The method of claim 1, and further comprising the step of:

varying vacuum in an area of a teat end in a milking cup based on the comparison of the parameter to the reference value.

11. The method of claim 1, in which the reference value for the parameter total pressure per cycle lies between 6.75 kPa's and 9 kPa's.

12. The method of claim 1, in which the reference value for the parameter minimum total pressure per cycle lies between 5.30 kPa's and 8.10 kPa's.

13. The method of claim 1, in which the reference value for the ratio of total suction to total pressure lies between 2.75 and 3.75.

* * * * *

UNITED STATES PATENT AND TRADEMARK OFFICE
CERTIFICATE OF CORRECTION

Page 1 of 1

PATENT NO. : 10,827,720 B2
APPLICATION NO. : 16/359607
DATED : November 10, 2020
INVENTOR(S) : Uhlenbruck et al.

It is certified that error appears in the above-identified patent and that said Letters Patent is hereby corrected as shown below:

On the Title Page

Item (63) The Related U.S. Application Data, Column 1 currently reads "Continuation of application No. 14/385,988, filed as application No. PCT/EP2013/056029 on Mar. 22, 2013, now Pat. No. 10,251,366." needs to be corrected to read as -- Continuation of application No. 14/385,988, filed on September 17, 2014, filed as application No. PCT/EP2013/056029 on Mar. 22, 2013, now Pat. No. 10,251,366. --.

In the Claims

Column 7, Claim 1, Line 7, "comparing the parameter to at least one a referenced value." should be corrected to read as -- comparing the parameter to a referenced value. --.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*